May 18, 1943     F. C. WALLACE     2,319,376
RIVET
Filed Aug. 24, 1942
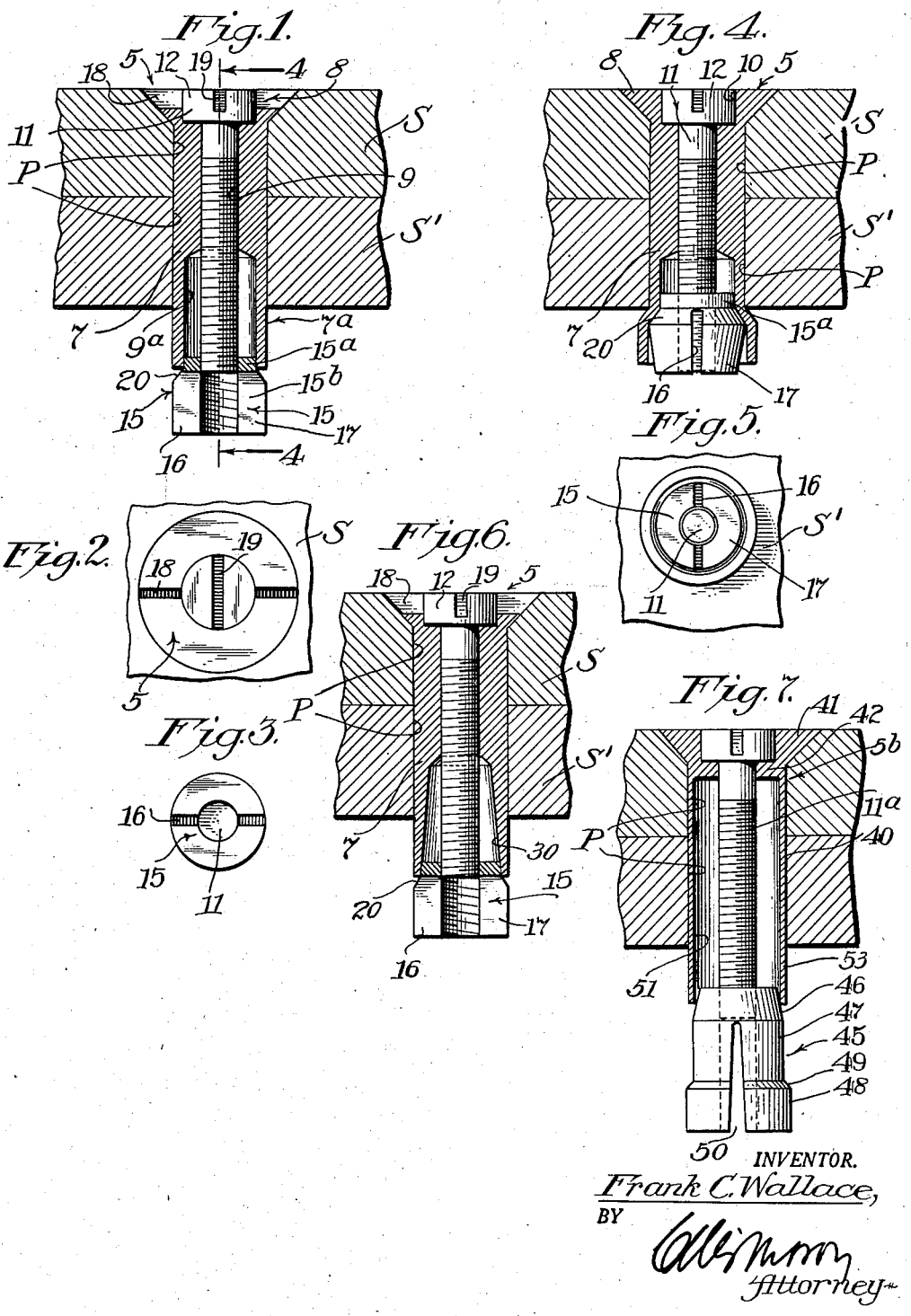

Patented May 18, 1943

2,319,376

UNITED STATES PATENT OFFICE 2,319,376

RIVET

Frank C. Wallace, Los Angeles, Calif., assignor, by mesne assignments, to Herman H. Helbush, Beverly Hills, Calif.

Application August 24, 1942, Serial No. 455,859

2 Claims. (Cl. 85—40)

This invention has to do with rivets or fasteners and, in its more particular aspects, it relates to self-locking rivets.

In various riveting operations, and particularly in aircraft manufacture, plates or sheets must be riveted together or to structural frame members which are so positioned that it is impossible to gain access to both ends of the rivet, so that the rivet must be both inserted and expanded by operating from one end of an opening in the plate or sheet. While there are presently known rivets available for such purposes, they have certain objectionable features. For instance, after being applied, an objectionable length of the rivet projects outwardly beyond the plate or frame member through which it is inserted; or they are unsuited for riveting extremely thin sheets; or they tend to become loose due to vibration.

My improved rivet overcomes those shortcomings and at the same time it is extremely economical of manufacture and application, is very durable and becomes automatically locked in position as it is applied.

Another object of my invention is to provide means for tightening the fit of the rivet in the hole in which it is mounted in the work.

Still further advantages are inherent in my invention and how those as well as the foregoing named advantages are achieved will become apparent from the following description of a presently preferred embodiment, for which purpose I shall now refer to the accompanying drawing, in which:

Fig. 1 is a longitudinal section, partly in elevation, showing the rivet in course of being applied to superposed plates;

Fig. 2 is a top plan view of the rivet;

Fig. 3 is a bottom plan view;

Fig. 4 is a sectional view partly in elevation on line 4—4 of Fig. 1 but showing the rivet after its expansible end has been expanded;

Fig. 5 is a bottom plan view of Fig. 4;

Fig. 6 is a longitudinal section, partly in elevation, showing a variational form of my rivet; and Fig. 7 is a longitudinal section, partly in elevation, showing a further variational form of my invention.

Referring to the drawing, Figs. 1-5, inclusive, I show a pair of superposed perforated plates S, S' secured together by my improved rivet, generally designated by the numeral 5.

The rivet is comprised of a tubular body 7 of an outside diameter insertable through the registering perforations P in the plates, the outer end of the body having a head 8 adapted to fit in a countersink in the plate S, the inner end 9a of the body bore 9 being of relatively increased diameter. It will be understood, of course, that the head 8 may be of any desired shape, and may not be countersunk in all cases. The inner end 7a of the body projects beyond the periphery of the perforation in plate S' and is laterally expansible. The headed end of the body is countersunk at 10 to receive the head 12 of a screw 11, the shank of which screw extends longitudinally of the bore of the body and is threaded at its inner end into an expander nut 15. The shank of screw 11 does not threadedly engage the bore of the body. A transverse slot 18 is provided in head 8 of the body to receive a suitable tool, not shown, to hold it against rotation during the expanding operation to be described.

Nut 15 has an inner end portion 15a of reduced diameter fitting in the increased diameter bore of the body and has an enlarged diameter outer end portion 15b, the nut being longitudinally slotted at 16 from its outer end to provide bifurcations 17. Between the portions 15a and 15b of the nut there is a tapered shoulder 20 which has lateral engagement with the periphery of the body bore to laterally expand the inner end of the body as will be hereinafter described.

In Fig. 1, I show my rivet with the parts in the position which they occupy after the rivet is first inserted through the registering perforations in the superposed sheets and before the screw is operated to expand the inner end of the body, while, in Fig. 4, I show the parts in the position which they occupy after the inner end of the body is expanded and the device self-locked in position. To expand the inner end of the rivet, it is only necessary to rotate the screw 11 by a suitable tool, not shown, engaged in the screw slot 19, which acts to draw the shoulder 20 against the inner end of the body, the nut being frictionally held against rotation by its engagement with the body and the body being held against rotation by a suitable tool, not shown, engaged in slot 18. This movement of the expander nut acts to laterally expand the inner end of the body, as shown in Fig. 4.

The engagement of the shoulder 20 against the body causes the bifurcations 17 of the expander nut to constrict the end of screw 11 whereby to lock the nut against becoming loose or escaping due to subsequent vibration.

In Fig. 6, I show a variational form of my rivet in which the parts are as before described except that the lower end 30 of the bore is tapered to facilitate movement of the nut in the course of the expanding operation.

In Fig. 7, I show a further variational form of my invention wherein the tubular body 5b has a relatively thin, laterally expansible side wall 40 throughout its length except for its head 41 and the reduced diameter outer end portion 42, and the expander nut 45 has an elongated inner end tapering at 46 to a relatively larger diameter portion 47, which latter intersects the relatively larger diameter outer end 48 by means of a tapered shoulder 49, the nut being longitudinally slotted at 50 for the purpose before described. An advantage of this construction is that as the screw 11a is rotated with respect to the body and nut to draw the nut inwardly of the body, the projecting lower end 53 of the body is engaged and laterally expanded by the shoulder 49 and outer end 48 of the nut, while the body side wall portion intermediate its ends is also slightly expanded against the side walls of the perforations in the sheets S, S' by the portion 47 of the nut, the nut portion 47 being slightly larger in diameter than is the inner diameter of the body bore 51. This results in effecting a very tight fit of the body in the perforations.

Within the broader aspects of my invention as defined by the appended claims, the structure hereinabove specifically described for the purposes of making my invention understood may be varied in various respects, since the invention is capable of being carried out in other specific forms of apparatus.

I claim:

1. A fastener comprising a tubular body presenting a laterally expansible side wall, said body being of an outside diameter insertable through a perforation in work to be riveted, a screw rotatably mounted longitudinally in the body, and an expander nut threadedly mounted on the screw, said expander nut having a portion between its ends which, upon rotation of the screw relative to the nut, has lateral expanding engagement with the body side wall within the perforation, and an outer end portion of relatively larger diameter which has lateral expanding engagement with an end portion of the body.

2. A fastener comprising a tubular body presenting a laterally expansible side wall, said body being of an outside diameter insertable through a perforation in work to be riveted, a screw rotatably mounted longitudinally in the body, an expander nut threadedly mounted on the screw, said expander nut having a medial portion which, upon rotation of the screw relative to the nut, has lateral expanding engagement with the body side wall within the perforation and an outer end portion of relatively larger diameter which has lateral expanding engagement with an end portion of the body and a slot dividing the medial and outer end portions of the nut into segments compressible against the screw by virtue of expanding engagement of the nut with said body portions.

FRANK C. WALLACE.